G. W. HILDRETH.
Cultivator.
No. { 1,362, 32,366. }
Patented May 21, 1861.
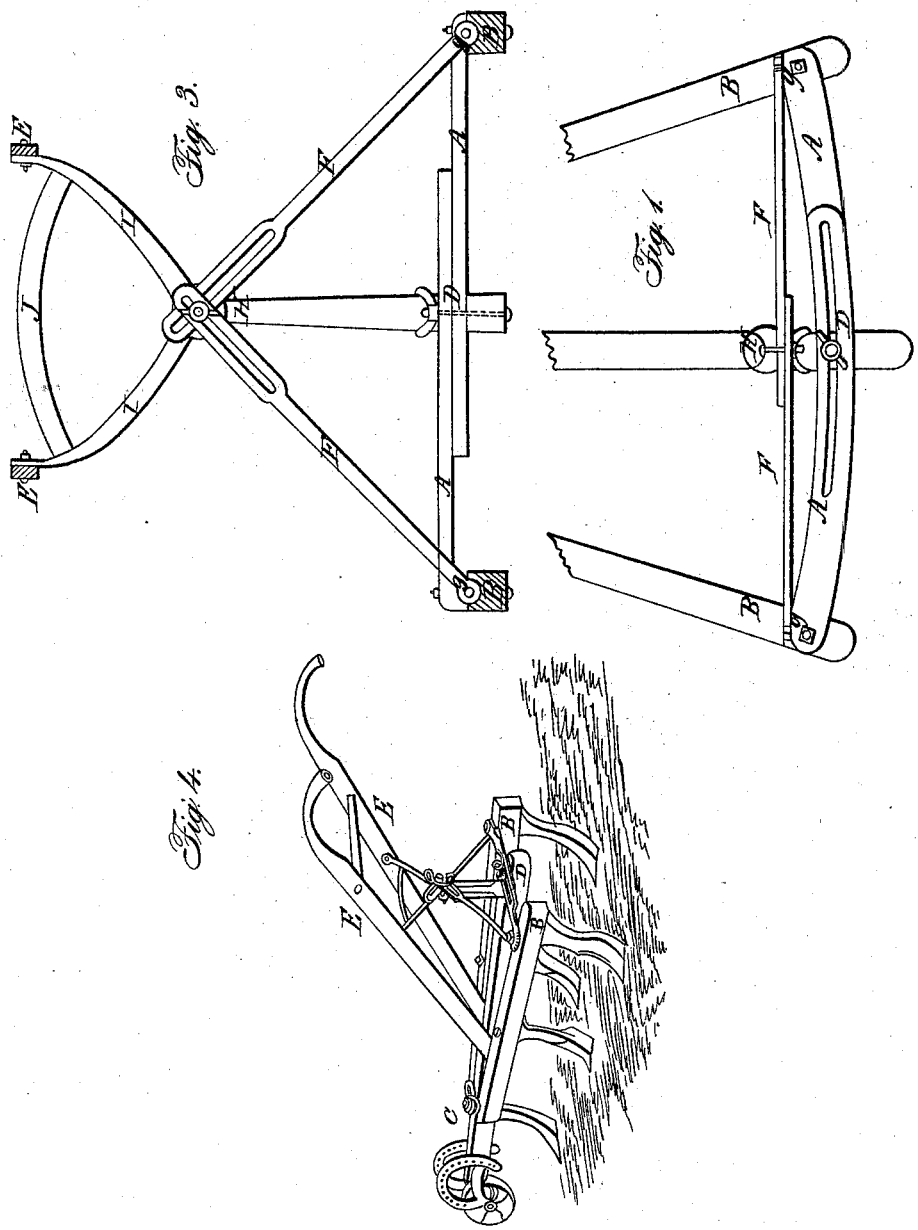
Witnesses:
C. G. Hildreth
H. L. Hildreth
Inventor:
G. W. Hildreth

UNITED STATES PATENT OFFICE.

GEORGE W. HILDRETH, OF LOCKPORT, NEW YORK.

IMPROVEMENT IN CULTIVATORS.

Specification forming part of Letters Patent No. 32,366, dated May 21, 1861.

*To all whom it may concern:*

Be it known that I, GEORGE W. HILDRETH, of Lockport, in the county of Niagara, in the State of New York, have invented an Improvement in Cultivators (or Horse-Hoes;) and I do hereby declare that the following is a full and exact description thereof, reference being had to the accompanying drawings, and to the letters of reference marked thereon, which refer to the same parts in the various figures.

Figure 1 is a plan. Fig. 3 is a transverse section. Fig. 4 is a perspective view.

The nature of my invention consists in forming an expanding and contracting truss, first, by horizontal slide-irons lapping upon each other, with a bolt passing through slots (or holes) in said irons, to tighten and hold them at any desired point, thus forming the base of a triangle, the outer ends of which are bolted to the outer beams of a cultivator and the center to the middle beams of a cultivator; second, adding similar slide-irons, forming the sides of an isosceles triangle, connected to the base (at the outer ends) by a joint, and lapping at the top in the center upon an upright post, forming a truss when the bolts in the slits are tightened. Upon slacking the bolts in the slits, the truss may be lengthened or shortened, giving any desired width to the working of the cultivator, and thereby securing strength, lightness, and variableness, which cannot be secured in any other way.

To enable others skilled in the art to make and use my invention, I will proceed to describe its construction and operation.

I construct two slides of iron, as seen in Figs. 1 and 2, A A, with a slit, (or series of holes,) so that when the bolt in the center is slackened they may be made to lap more or less, thereby lengthening or shortening the extreme length. The outer ends of these slides are attached to the outer beams of a cultivator, B B, which widens or narrows them at pleasure, at the rear end, while the forward end of these beams extend convergingly to a center at the middle beam, as seen in Fig. 4 at C. At the rear end of the middle beam the bolt with nut is tightened, as seen at D in Figs. 1, 3, and 4, which is the ordinary of making them; but they lack strength, especially when controlled by the handles E E. To overcome this weakness I construct two additional slide-irons, F F, which are connected to the horizontal slide-irons at their outer ends by a joint at $g$ $g$, then extending upward and inward, lapping across each other upon an upright post at H in Fig. 3, the upper ends of these slide-irons having slits (or holes) similar to the horizontal slide-irons, to admit of lengthening and shortening to correspond with the horizontal slide-irons, thus forming a truss in the form of an isosceles triangle, making the frame very firm and strong when the thumb-nuts are tightened up.

Operation: By this truss the implement can be set to work any desired width between the rows of standing crops and be secured very strong. The teeth in this implement may be of any desired form to suit the farmer.

I do not claim the horizontal slide-irons A A, which form the base of the triangle, when used separately; but I do claim—

The double slide-irons F F, or their equivalents, with the horizontal slide-irons, when used to form a triangular contracting or expanding truss, for strengthening the cultivator, as herein set forth.

G. W. HILDRETH.

Witnesses:
 C. G. HILDRETH,
 H. L. HILDRETH.